United States Patent
Agrawal

(10) Patent No.: US 10,437,615 B2
(45) Date of Patent: Oct. 8, 2019

(54) EMOTIONALLY CONNECTED RESPONSES FROM A DIGITAL ASSISTANT

(71) Applicant: MICROSOFT TECHNOLOGY LICENSING, LLC, Redmond, WA (US)

(72) Inventor: Puneet Agrawal, Hyderabad (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 555 days.

(21) Appl. No.: 14/930,216

(22) Filed: Nov. 2, 2015

(65) Prior Publication Data

US 2017/0123825 A1    May 4, 2017

(51) Int. Cl.

| | |
|---|---|
| *G06F 3/0481* | (2013.01) |
| *G06F 9/451* | (2018.01) |
| *G06F 16/2457* | (2019.01) |
| *G06F 3/0484* | (2013.01) |
| *G06F 3/16* | (2006.01) |
| *G06F 17/24* | (2006.01) |
| *G06T 11/60* | (2006.01) |
| *G06F 16/332* | (2019.01) |

(52) U.S. Cl.
CPC ............ *G06F 9/453* (2018.02); *G06F 3/0481* (2013.01); *G06F 3/0484* (2013.01); *G06F 3/167* (2013.01); *G06F 16/24575* (2019.01); *G06F 16/3329* (2019.01); *G06F 17/241* (2013.01); *G06T 11/60* (2013.01)

(58) Field of Classification Search
CPC ...... G06F 3/0481; G06F 3/0484; G06F 3/167; G06F 16/24575; G06F 17/241
See application file for complete search history.

(56) References Cited

U.S. PATENT DOCUMENTS

| | | |
|---|---|---|
| 5,710,832 A | 1/1998 | Berman et al. |
| 6,995,749 B2 | 2/2006 | Friend |
| 7,158,678 B2 | 1/2007 | Nagel et al. |
| 7,161,598 B2 | 1/2007 | Klassen |

(Continued)

FOREIGN PATENT DOCUMENTS

WO    2014079534 A1    5/2014

OTHER PUBLICATIONS

"Mi-Co Provides Handwritten Messaging Directly From PDA Screen", Published on: Jun. 5, 2001, Available at: http://www.mi-corporation.com/news-and-events/news/mi-co-provides-handwritten-messaging-directly-from-pda-screen/.

(Continued)

*Primary Examiner* — Andrea C Leggett
(74) *Attorney, Agent, or Firm* — Shook, Hardy & Bacon, L.L.P.

(57) ABSTRACT

Systems, methods, and computer-readable storage media are provided for providing personalized, emotionally connected responses from a digital assistant. The emotionally connected (personalized) responses may include, among other things, a handwritten response. The handwritten response may be provided in an image format in a handwriting script unique to the digital assistant. The emotionally connected responses may be provided in response to an event that triggers emotionally connected/personalized responses such as emotional query inputs, calendar entries, holidays, tasks, and the like.

15 Claims, 4 Drawing Sheets

(56) References Cited

U.S. PATENT DOCUMENTS

| | | |
|---|---|---|
| 7,894,836 B1 | 2/2011 | Fuoss et al. |
| 8,948,818 B2 | 2/2015 | Wang |
| 9,507,805 B1* | 11/2016 | Chechik ............... G06F 16/532 |
| 2003/0038788 A1 | 2/2003 | Demartines et al. |
| 2003/0163525 A1 | 8/2003 | Hendriks et al. |
| 2004/0121298 A1 | 6/2004 | Creamer et al. |
| 2005/0117527 A1* | 6/2005 | Williams ............... G06Q 10/10 370/260 |
| 2010/0188230 A1 | 7/2010 | Lindsay |
| 2013/0311186 A1* | 11/2013 | Lee ......................... G10L 15/26 704/260 |
| 2014/0247383 A1 | 9/2014 | Dave et al. |
| 2015/0178392 A1 | 6/2015 | Jockisch et al. |
| 2015/0242679 A1 | 8/2015 | Naveh |

OTHER PUBLICATIONS

"Robin—the Siri Challenger", Published on: Aug. 15, 2014, Available at: https://play.google.com/store/apps/details?id=com.magnifis.parking&hl=en.

"Assistant", Published on: Sep. 24, 2014, Available at: https://assistant.ai/.

"International Search Report Issued in PCT Application No. PCT/US2016/058557", dated May 11, 2017, 11 Pages.

* cited by examiner

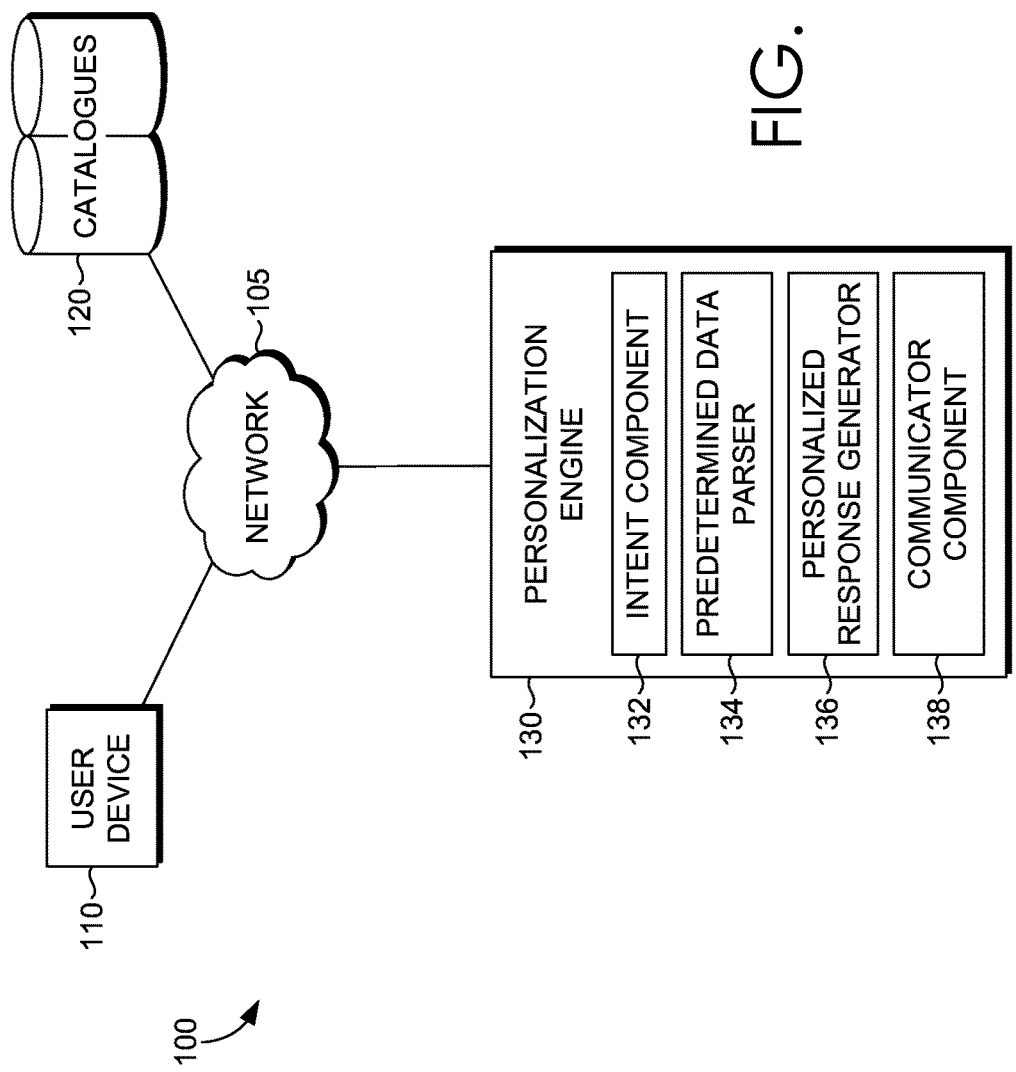

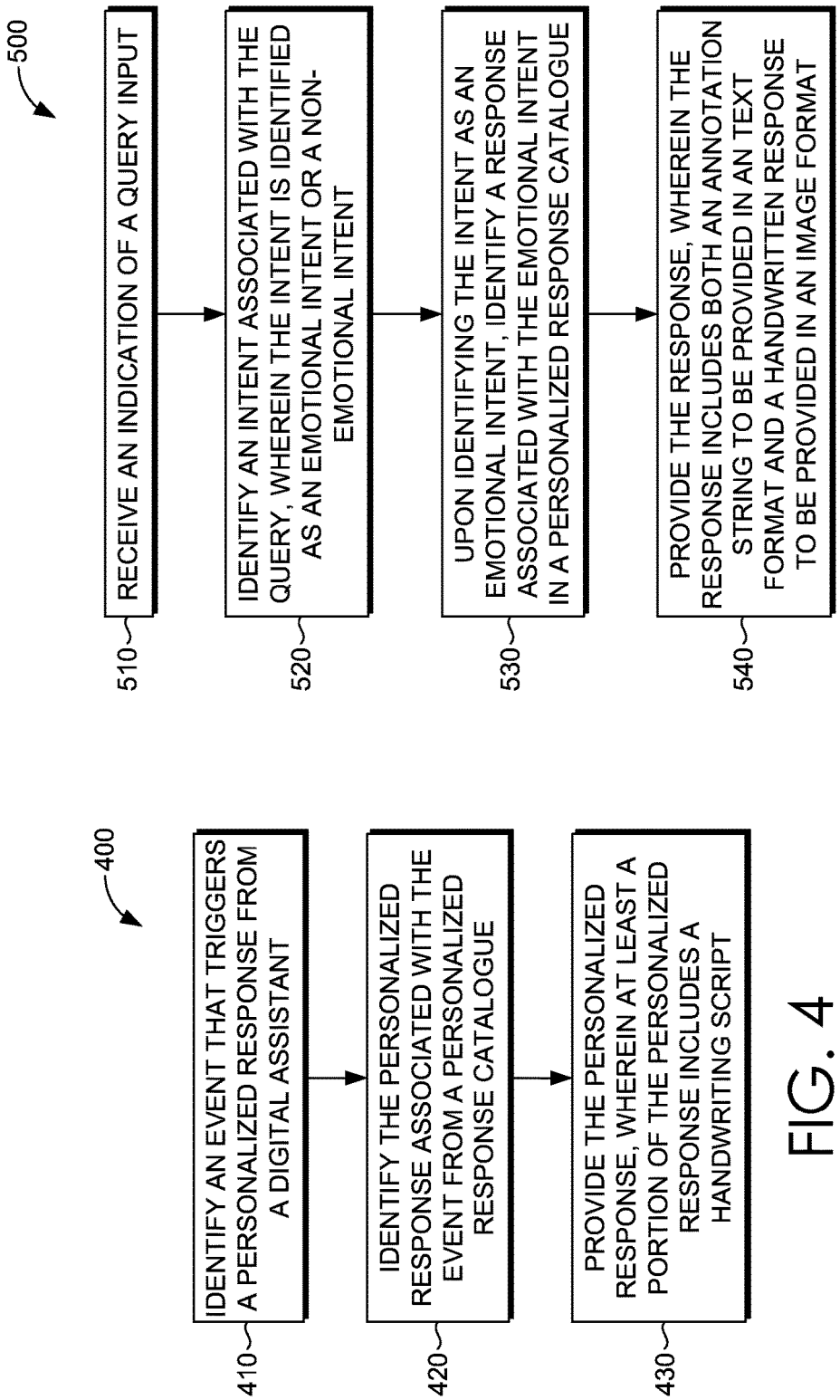

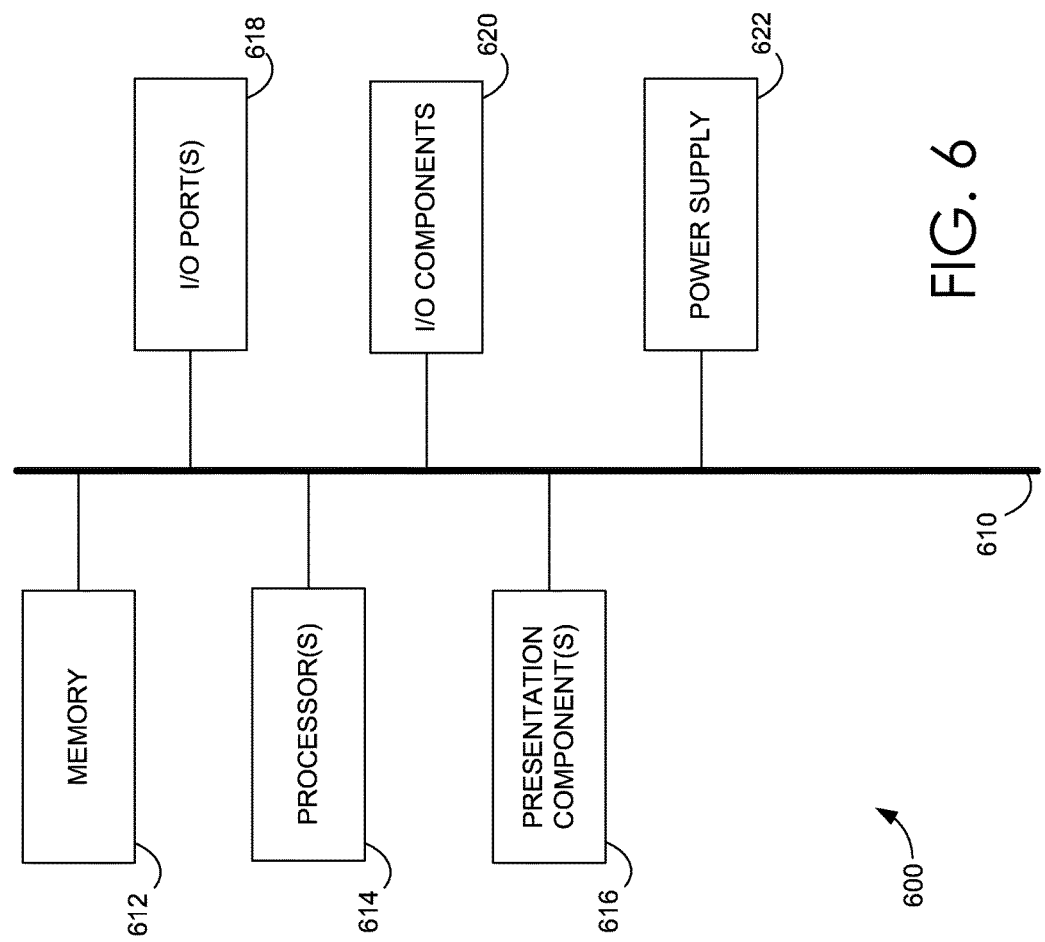

EMOTIONALLY CONNECTED RESPONSES FROM A DIGITAL ASSISTANT

BACKGROUND

Personal or digital assistants are increasingly popular and are continuously becoming more personalized. For example, digital assistants have unique voices, names, etc. Additional personality dimensions are constantly sought out in an effort to increase connections with users.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Aspects of the technology described herein provide a personalized digital assistant that provides emotionally connected or personalized responses and/or messages to users. A goal of the technology described herein is to increase connections between a digital assistant and a user and increase user satisfaction with their digital assistant. This technology further distinguishes digital assistants from one another.

BRIEF DESCRIPTION OF THE DRAWINGS

Aspects of the technology described in the present application are described in detail below with reference to the attached drawing figures, wherein:

FIG. 1 is a diagram depicting an exemplary computing environment that can be used to generate an emotionally connected response, in accordance with an aspect of the technology described herein;

FIG. 4 is a diagram depicting a method of providing emotionally connected responses, in accordance with an aspect of the technology described herein;

FIG. 5 is a diagram depicting a method of providing emotionally connected responses, in accordance with an aspect of the technology described herein; and FIG. 6 is a block diagram of an exemplary computing environment suitable for implementing aspects of the technology described herein.

DETAILED DESCRIPTION

Figure 3:
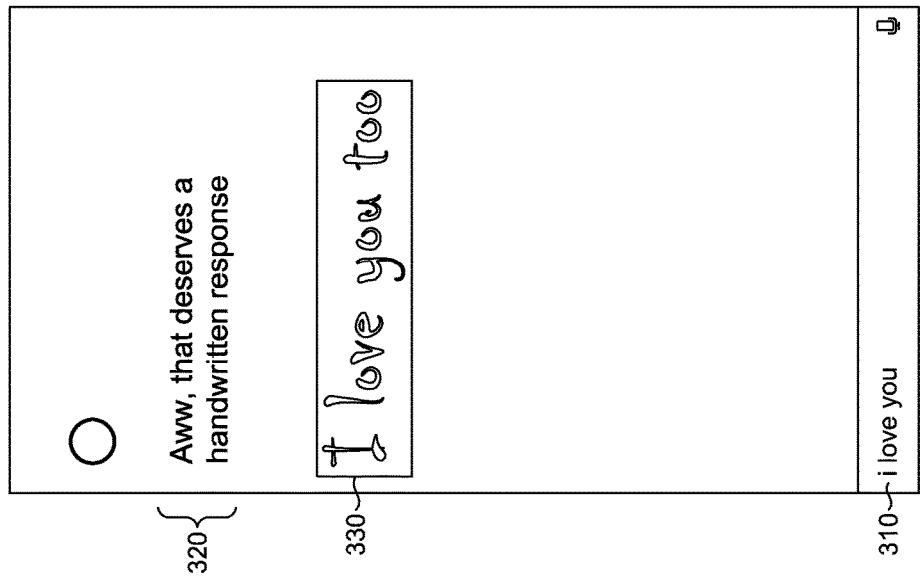
FIG. 3 is a diagram depicting a personalized messaging interface, in accordance with an aspect of the technology described herein.

The technology of the present application is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the technology described herein are directed towards systems, methods, and computer storage media for, among other things, providing emotionally connected messages, notes, or responses from digital assistants. Digital assistants currently have limited capabilities to provide responses/messages/notes to a user. For instance, digital assistants typically provide a simple, text-only non-emotional response. Aspects of the technology can make optimal use of the limited capabilities by personalizing messages provided to users and making the responses emotionally connected. For example, a unique handwriting script may be utilized by the digital assistant to provide personalized, emotionally connected messages. The personalized messages may be emotional messages. The term "emotional," as used herein, refers generally to an expression of emotion. Typical emotions include joy, sorrow, love, fear, hate, or the like.

The personalized messages may be triggered by one or more events. The term "event" is used broadly herein to include communication events, which refers to nearly any communication received or initiated by a computing device associated with a user (e.g., query inputs). The term "event" may also refer to a reminder, calendar entry, task, announcement, or news item (including news relevant to the user such as local or regional news, weather, traffic, or social networking/social media information). Thus, by way of example and not limitation, events can include query inputs, notifications; news items relevant to the user; tasks that a user might address or respond to; calendar events, reminders, or notifications; meeting requests or invitations; or the like. Some events may be associated with an entity (such as a contact or business, including in some instances the user) or with a class of entities (such as close friends, work colleagues, boss, family, business establishments visited by the user, etc.).

The events may be categorized into, among other things, emotional query inputs and predetermined events. Emotional query inputs, as indicated hereinabove, refer generally to a query that is indicative of a human emotion. Exemplary emotional query inputs include, but are not limited to, "I love you," "Will you marry me," "kiss me," "will you be my girlfriend," etc. Predetermined events, as used herein, refer generally to events that are identified using user data other than query inputs such as, for example, calendar entries, holidays, task items, etc. These predetermined events may be entered by a user or may be preset in an application (e.g., national holidays, such as Thanksgiving, are included in most calendar applications as defaults).

Having briefly described an overview of aspects of the technology described herein, an exemplary operating environment suitable for use in implementing the technology is described below in order to provide a general context for various aspects. Referring to the figures in generally and initially to FIG. 1 in particular, an exemplary operating environment is shown and designated generally as exemplary operating environment 100. The exemplary operating environment 100 is but one example of a suitable computing environment and is not intended to suggest any limitation as to the scope of use or functionality of aspects of the technology described herein. Neither should the exemplary operating environment 100 be interpreted as having any dependency or requirement relating to any one component nor any combination of components illustrated.

Turning now to FIG. 1, a block diagram is provided showing an example operating environment 100 in which some aspects of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

In one embodiment, the functions performed by components of operating environment 100 are associated with one or more digital assistant applications, services, or routines. In particular, such applications, services, or routines may operate on one or more user devices (such as user device 110), servers, may be distributed across one or more user devices and servers, or be implemented in the cloud. Moreover, in some embodiments, these components of system 100 are distributed across a network, including one or more servers and computing devices (such as user device 110), in the cloud, or may reside on a user device. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 100, it is contemplated that in some embodiments functionality of these components can be shared or distributed across other components.

Among other components not shown, example operating environment 100 includes a number of user devices, such as user device 110; a number of databases, such as catalogues 120; a personalization engine 130; and network 105. It should be understood that environment 100 shown in FIG. 1 is an example of one suitable operating environment. Each of the components shown in FIG. 1 may be implemented via any type of computing device, such as computing device 600, described in connection to FIG. 6, for example. These components may communicate with each other via network 105, which may include, without limitation, one or more local area networks (LANs) and/or wide area networks (WANs). In exemplary implementations, network 105 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, personalization engine 130 may be provided via multiple devices arranged in a distributed environment that collectively provide the functionality described herein. Additionally, other components not shown may also be included within the distributed environment.

User device 110 can be client devices on the client-side of operating environment 100, while the personalization engine 130, for example, can be on the server-side of operating environment 100. The personalization engine 130 can comprise server-side software designed to work in conjunction with client-side software on user device 110 so as to implement any combination of the features and functionalities discussed in the present disclosure. This division of operating environment 100 is provided to illustrate one example of a suitable environment, and there is no requirement for each implementation that any combination of server and user devices remain as separate entities.

User device 110 may comprise any type of computing device capable of use by a user. For example, in one embodiment, user device 110 may be the type of computing device described in relation to FIG. 6 herein. By way of example and not limitation, a user device may be embodied as a personal computer (PC), a laptop computer, a mobile device, a smartphone, a tablet computer, a smart watch, a wearable computer, a fitness tracker, a virtual reality headset, augmented reality glasses, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, or any combination of these delineated devices, or any other suitable device.

The database (catalogues) 120 can be accessible to any components illustrated in the example operating environment 100. The database 120 can comprise, among other things, user profiles associated with one or more user devices, digital assistant responses, a plurality of event:personalized response pairs, and the like. Event:personalized response pairs, as used herein, refers to groupings comprising at least one event and at least one personalized, emotionally connected response associated with the event and may be part of a personalized response catalogue of database 120. For example, an emotional input (as described in detail below) of "I love you" may be paired with the personalized response of "I love you too." This is an example of an event:personalized response pair. In embodiments, the personalized responses are in the form of handwritten notes provided via images, as will be discussed in detail below.

The personalization engine 130 can comprise server-side software designed to work in conjunction with client-side software on the user device 110 so as to implement any combination of the features and functionalities discussed in the present disclosure. For example, the personalization engine 130 may run on a server and personalize digital assistant messages. As previously explained, this division of system 100 is provided to illustrate one example of a suitable environment, and there is no requirement for each implementation that any combination of the personalization engine 130 and the user device 110 remain as separate entities.

The personalization engine 130 comprises an intent component 132, a predetermined data parser 134, a personalized response generator 136, and a communicator component 138. The personalization engine 130 may have access to one or more components of the system 100 such as the database 120 and the user device 110. The personalization engine 130 can facilitate generation of personalized responses from digital assistants. The personalization engine 130 may be embodied as a set of compiled computer instructions or functions, program modules, computer software services, or an arrangement of processes carried out on one or more computer systems, such as computing device 600 described in connection to FIG. 6, for example.

Initially, the personalization engine 130 may be configured to aggregate event data utilized during the generation of personalized, emotionally connected responses. The aggregated data may be received, retrieved, collected, etc., from a plurality of sources such as, for example, database 120, user device 110, and the like. The events aggregated may be identified as triggering events and non-triggering events. Non-triggering events refer to events that do not initiate generation of a personalized response (e.g., a handwritten response) from a digital assistant such as a non-emotional query input. Triggering events refer to events that do trigger generation of a personalized response from a digital assistant. Triggering events may include emotional query inputs, predetermined data events, and the like. Specifically, triggering events may be referred to as events that may elicit a response that includes more than a factual statement. For instance, queries for directions, operating hours, addresses, contact information, etc. are all satisfied with typical factual responses. In other words, no emotion is discussed.

Figure 2:
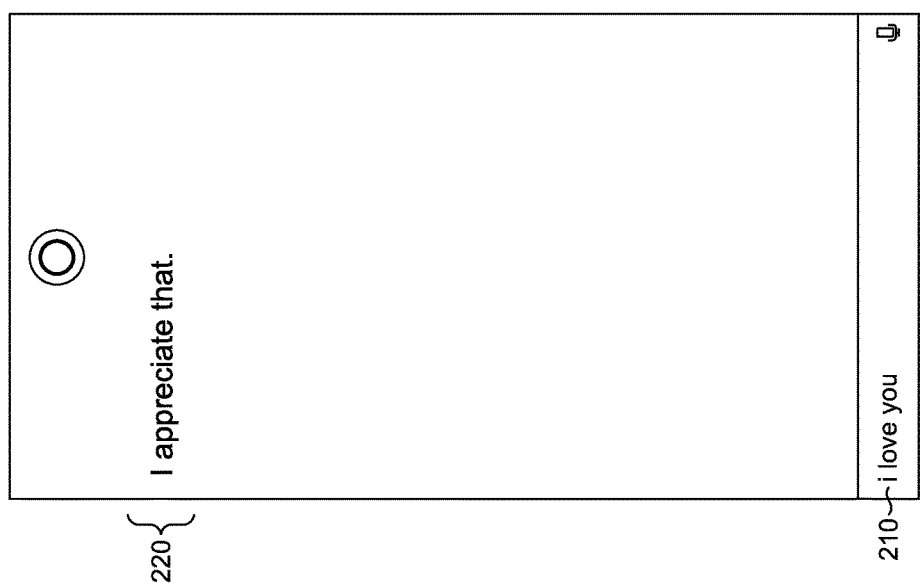
FIG. 2 is a diagram depicting a messaging interface, in accordance with an aspect of the technology described herein.

Non-triggering events are dealt with in a typical fashion as illustrated in FIG. 2. FIG. 2 provides a typical, existing messaging interface 200. This embodies how non-triggering events are handled and how, prior to the present invention, an emotional statement would have been handled. The messaging interface 200 includes a user input 210. The input "I love you" would, in the present invention, be identified as an emotional input but is treated no differently in traditional digital assistant programs. Typically, an input (regardless of emotional, non-emotional, triggering, non-triggering, etc.) would simply be met with a non-personalized, non-emotionally connected response 220. The non-emotionally connected response 220 is simply an annotation string (i.e., a string of text).

Query inputs may be identified as emotional or non-emotional based on an absence or presence of keywords that indicate an expression of emotion. Typical emotions include joy, sorrow, love, fear, hate, or the like. Exemplary keywords embodying those emotions may be "love," "afraid," "sad," "relationship," "pretty," etc. Query inputs may be identified as emotional or non-emotional by the intent component 132 of the personalization engine 130. The intent component 132 may be configured to parse inputs to identify keywords that are indicative of emotions to identify emotional inputs. Emotional, as used herein and previously explained, refers generally to an expression of an emotion and the inclusion of a keyword that indicates such an expression of an emotion.

Triggering events may also include predetermined data events. Predetermined data, as used herein, refers to any data that is not a query input. Predetermined data may be a triggering event when it is identified to include emotional data in the same way as emotional keywords are identified. Emotional data is used herein to refer to information that is associated with emotions and elicits an emotional response. For instance, holidays may be associated with well wishes, birthdays may be associated with birthday greetings, etc. Predetermined data may be accumulated from any source including calendars, task lists, lists of holidays, notes, office calendars, personal calendars, social media calendars, or even calendars from family members or friends of the user, etc. As will be appreciated, much of the data in said sources will not be classified as triggering data as it will not elicit an emotional response. For instance, a meeting with a co-worker in a calendar may not be triggering predetermined data. However, a work anniversary in a user's calendar may elicit an emotional response (e.g., an anniversary greeting). The predetermined data is analyzed by the predetermined data parser 134 of the personalization engine 130. Initially, the predetermined data parser 134 determines whether the predetermined data includes emotional indicators (e.g., emotional keywords, etc.). If yes, the predetermined data is automatically treated as a triggering event. If the predetermined data does not include emotional indicators but is still identified as being associated with an emotional response (e.g., a work anniversary, a holiday, etc.) then the predetermined data will still be treated as a triggering event. Predetermined data that does not include emotional indicators and is not associated with an emotional response (in the personalized response catalogue of the database 120, for instance) is not a triggering event and is classified as a non-triggering event. Predetermined data, it is worth noting, may be data that is pre-existing in any one of the data sources previously described. Alternatively, predetermined data may be identified and analyzed by the predetermined data parser 134 upon entry into the data source. For instance, as a user inputs a date into their calendar, for example, the predetermined data parser 134 may go ahead and identify the entry as a non-triggering or triggering event during user entry of the data.

Once the intent component 132 and the predetermined data parser 134 have identified one or more triggering events, the personalized response generator 136 of the personalization engine 130 generates a personalized response to provide for the triggering event. The personalized response may be identified using a look up function from, for example, the database 120. The database 120, as previously described, includes a plurality of event:personalized response pairs. Thus, once an event is identified as a triggering event, a corresponding personalized response is identified by the personalized response generator 136.

The personalized response, in embodiments, is provided in a handwriting script. The handwriting may be a script, cursive, print, etc., but it is personalized to the digital assistant. As typical interfaces do not provide free form text, the handwritten note may be provided in an image format. Thus, the personalized response may include an annotation string and an image that includes the handwritten, personalized note. An exemplary interface is provided in FIG. 3 with personalized messaging interface 300. The interface includes a query input 310 that is identified as a triggering event (it includes one or more emotional keywords). A personalized response at that point may simply provide an image 330 that includes the handwritten note. Here, the response "I love you too" is provided in a personalized handwritten format and provided within image 330. The personalized image is sufficient for a personalized response. The personalized response may also include an annotation string 320. The annotation string may simply be a textual response as illustrated in FIG. 2 (shown as annotation string 220) that does not reference the image 330. In embodiments, the annotation string 320 does reference the image 330. As shown in FIG. 3, the annotation string 320 recites "Aww, that deserves a handwritten response." The reference to the handwritten response in the annotation string 320 is a reference to the handwritten response of the image 330.

In embodiments, the image of the personalized response may include handwritten messages, items, or a combination thereof. For example, FIG. 3 illustrates an image including handwritten text. An additional example would be a personalized message sent to a user where the image includes a graphic such as a pumpkin on Halloween or a birthday cake in a birthday message. Additionally, the image may include both a handwritten message and an item such as the handwriting in FIG. 3 ("I love you too") along with an image of a heart.

Once generated, the personalized, emotionally connected response is communicated for display by the communicator component 138. The personalized response may be communicated, for instance, to the user device 110. The personalized responses may be provided in audio format in whole or in part. For example, the annotation strings may be provided in audio format as well as text format.

Various components of the above-described technology may take place in an online or offline setting. As used herein, "online" includes a state of being communicatively connected to, with, and/or accessible by, a network, such as the Internet or other type of communication network. Thus, when a device is online, it may communicate with other online devices, such as a server, among others. Online storage includes storage that is accessible via a network. As one example, online storage may refer to cloud storage or storage of data on a server that is accessible online, i.e., when a network connection is available. "Offline" includes a state of not being connected to, or accessible by, such a network. Offline storage includes storage that may be accessed without a network connection. Offline storage may also be referred to as local storage. As one example, a mobile device or other type of computing device may include offline, or local, storage, e.g., a memory device, which is directly accessible by a mobile/computing device.

In embodiments, the present invention may be utilized in a physical sense rather than a digital sense. For example, an entity associated with the digital assistant may arrange to provide physical, handwritten messages for a user. For instance, a digital assistant may know the home address of the user. The entity associated with the digital assistant may arrange to have a personalized, physical card delivered to the user, where the card is personalized with the handwriting unique to the digital assistant. An additional embodiment may provide for physical cards to be used in a "treasure hunt-type" experience. For example, a physical card could include a personalized message for a user to provide to the digital assistant in order to receive further instructions from the digital assistant. The physical card may, for example, include a treasure hunt clue that, when provided to the digital assistant, prompts the digital assistant to provide an additional treasure hunt clue.

Turning now to FIG. 4, a method 400 for generating personalized responses from digital assistants is provided, in accordance with an aspect of the technology described herein. Method 400 could be performed by a system that includes a personalization engine, such as personalization engine 130, described previously with reference to FIG. 1. Initially, at step 410, an event that triggers a personalized response from a digital assistant is identified. At step 420, the personalized response associated with the event is identified from a personalized response catalogue. At step 430, the personalized response is provided where at least a portion of the personalized response includes a handwriting script. The personalized response may include the handwriting script with an image as well as along with annotation strings.

Turning now to FIG. 5, a method 500 for generating personalized responses from digital assistants is provided, in accordance with an aspect of the technology described herein. Initially, at step 510, an indication of a query input is received. At step 520, an intent associated with the query is identified. The intent is identified as an emotional intent or a non-emotional intent. Emotional intents, as described herein, refer to intents that are associated with emotions and, often, include emotional keywords. At block 530, a response associated with the emotional intent is identified in a personalized response catalogue is identified upon identifying that the intent is an emotional intent. At block 540, the response is provided. The response may include both an annotation string and a handwritten script. The annotation string may be provided in an audio format and the handwritten script may be provided in an image format.

Exemplary Operating Environment

Referring to the drawings in general, and initially to FIG. 6 in particular, an exemplary operating environment for implementing aspects of the technology described herein is shown and designated generally as computing device 600. Computing device 600 is but one example of a suitable computing environment and is not intended to suggest any limitation as to the scope of use of the technology described herein. Neither should the computing device 600 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 6, computing device 600 includes a bus 610 that directly or indirectly couples the following devices: memory 612, one or more processors 614, one or more presentation components 616, input/output (I/O) ports 618, I/O components 620, and an illustrative power supply 622. Bus 610 represents what may be one or more busses (such as an address bus, data bus, or a combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 6 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 6 and refer to "computer" or "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 612 includes computer storage media in the form of volatile and/or nonvolatile memory. The memory 612 may be removable, non-removable, or a combination thereof. Exemplary memory includes solid-state memory, hard drives, optical-disc drives, etc. Computing device 600 includes one or more processors 614 that read data from various entities such as bus 610, memory 612, or I/O components 620. Presentation component(s) 616 present data indications to a user or other device. Exemplary presentation components 616 include a display device, speaker, printing component, vibrating component, etc. I/O ports 618 allow computing device 600 to be logically coupled to other devices, including I/O components 620, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 614 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

An NUI processes air gestures, voice, or other physiological inputs generated by a user. Appropriate NUI inputs may be interpreted as ink strokes for presentation in association with the computing device 600. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as stereoscopic camera systems, infrared camera systems, RGB camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

A computing device may include a radio 624. The radio 624 transmits and receives radio communications. The computing device may be a wireless terminal adapted to receive communications and media over various wireless networks. Computing device 600 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

Aspects of the technology have been described to be illustrative rather than restrictive. It will be understood that certain features and subcombinations are of utility and may be employed without reference to other features and subcombinations. This is contemplated by and is within the scope of the claims.

The invention claimed is:
1. A computing system comprising:
a processor; and
computer storage memory having computer-executable instructions stored thereon which, when executed by the processor, configure the computing system to:
identify an emotional query input from a user that triggers a personalized response from a digital assistant, wherein the emotional query input includes at least one emotional keyword indicating an emotion;
identify the personalized response associated with the emotional query input from a personalized response catalogue, wherein the personalized response catalogue includes a plurality of emotional query input: personalized response pairs, and wherein the personalized response associated with the emotional query input includes a handwriting script; and
provide, from the digital assistant, the personalized response that includes the handwriting script and is associated with the emotional query input, wherein the personalized response includes emotional content based on inclusion of the at least one emotional keyword in the emotional query input from the user indicating an emotion.

2. The system of claim 1, wherein the handwriting script is provided in an image format.

3. The system of claim 1, wherein the personalized response further includes one or more annotation strings, wherein annotation strings are text items provided in the personalized response.

4. The system of claim 1, wherein at least a portion of the personalized response catalogue includes a plurality of handwritten responses corresponding to events.

5. A method of generating a personalized response, the method comprising:
   identifying an event that triggers a personalized response from a digital assistant, wherein the event is an emotional query input from a user that includes at least one emotional keyword indicating an emotion;
   identifying the personalized response associated with the emotional query input from a personalized response catalogue, wherein the personalized response catalogue includes a plurality of event: personalized response pairs, and wherein the personalized response associated with the emotional query input includes a handwriting script; and
   providing, from the digital assistant, the personalized response that includes the handwriting script and is associated with the emotional query input, wherein the personalized response includes emotional content based on inclusion of the at least one emotional keyword in the emotional query input from the user indicating an emotion.

6. The method of claim 5, wherein the event further comprises a predetermined event that is identified from one or more of a calendar or a task list as an existing entry.

7. The method of claim 5, wherein the handwriting script is provided in an image format.

8. The method of claim 7, wherein the personalized response further includes one or more annotation strings, wherein annotation strings are text items provided in the personalized response.

9. The method of claim 8, wherein the annotation strings are provided in an audio format.

10. The method of claim 5, wherein at least a portion of the personalized response catalogue includes a plurality of handwritten responses corresponding to events.

11. The method of claim 5, wherein the personalized response is provided at least in part as an audio response.

12. A method of generating a personalized response comprising:
   receiving an indication of an emotional query input from a user, wherein the emotional query input includes at least one emotional keyword indicating an emotion;
   identifying a personalized response associated with the emotional query input in a personalized response catalogue, wherein the personalized response associated with the emotional query input includes a handwriting script; and
   providing, from a digital assistant, the personalized response that includes the handwriting script and is associated with the emotional query input, wherein the personalized response includes both an annotation string to be provided in a text format and the handwriting script to be provided in an image format, and wherein the personalized response includes emotional content based on the inclusion of the at least one emotional keyword in the emotional query input from the user indicating an emotion.

13. The method of claim 12, wherein the annotation string is provided as a textual response in addition to the handwriting script provided in the image format.

14. The method of claim 13, wherein the emotional query input is input as audio.

15. The method of claim 12, wherein the annotation string is further provided in an audio format.

* * * * *